United States Patent [19]
Takagi

[11] Patent Number: 5,159,469
[45] Date of Patent: Oct. 27, 1992

[54] MOIRE REMOVING DEVICE FOR IMAGE SCANNER

[75] Inventor: Izmi Takagi, Kuwana, Japan

[73] Assignee: Brother Kogyo Kabushiki Kaisha, Nagoya, Japan

[21] Appl. No.: 753,383

[22] Filed: Aug. 30, 1991

[30] Foreign Application Priority Data

Sep. 6, 1990 [JP] Japan .................. 2-238034

[51] Int. Cl.⁵ .............................................. H04N 1/23
[52] U.S. Cl. .................... 358/454; 358/227; 358/497
[58] Field of Search ............. 358/227, 454, 474, 497, 358/483; 359/209, 210, 211, 821; 355/52, 71, 235; 354/195.1, 195.12

[56] References Cited

U.S. PATENT DOCUMENTS

| | | | |
|---|---|---|---|
| 4,432,012 | 2/1984 | Licko et al. | 358/75 |
| 4,610,539 | 9/1986 | Kaneko et al. | 354/195.12 |
| 4,640,573 | 2/1987 | Kataoka et al. | 359/210 |
| 4,649,437 | 3/1987 | Watanabe | 358/474 |
| 4,893,195 | 1/1990 | Tada et al. | 358/454 |
| 4,908,717 | 3/1990 | Natori | 358/474 |
| 4,998,801 | 3/1991 | Shiraishi et al. | 359/571 |
| 5,021,822 | 6/1991 | Morikawa | 355/235 |
| 5,029,010 | 7/1991 | Shiraishi | 358/227 |

Primary Examiner—Leo H. Boudreau
Assistant Examiner—Steven P. Klocinski
Attorney, Agent, or Firm—Oliff & Berridge

[57] ABSTRACT

An image scanner including a camera portion which is provided with a lens, a CCD sensor and an optical glass component having a uniform thickness and refractive index greater than 1. The optical glass component is movable into and out of an optical path extending between an original and the CCD sensor. By the selective insertion of the optical glass component into the optical path, focussing and defocusing an image of the original is provided at the CCD sensor.

10 Claims, 4 Drawing Sheets

MOIRE REMOVING DEVICE FOR IMAGE SCANNER

BACKGROUND OF THE INVENTION

The present invention relates to an image scanner which employs an image sensor such as pickup elements, and more particularly, to a moire removing device for use in the image scanner.

Generally, in an image scanner, an original image is subdivided into a plurality of pixels, and each of the pixels are optically focussed on an optical sensor for the image read out operation. In a conventional image scanner, when reading a dot printed original image or a fine continuous pattern original image, a lens is disposed in a position for providing an intentionally defocused image so as to lower the spatial frequency of the image of the original on the image sensor in order to avoid generation of moire. Alternatively, image processing unit is additionally provided to remove the moire.

However, if the lens is defocused, resolution is lowered even when the spatial frequency of the image is low and the image may encounter Moire. Therefore, the defocusing would be disadvantageous for reading such images. On the other hand, if the Moire is to be removed by means of the image processing unit, extremely complicated proceedings have to be executed. Further, extremely long periods of time are required if a CPU is used for the processing. An electronic circuit may be available for performing the image processing within a short period of time. However, a large number of components may be required for constituting the electronic circuit.

SUMMARY OF THE INVENTION

It is therefore, an object of the present invention to overcome the above described drawbacks, and to provide an improved image scanner in which Moire can be removed when reading an original image such as a dot printed image or a fine continuous image which often encounter Moire, or when reading a high resolution image which may not encounter Moire.

This and other objects of the invention will be attained by providing an image scanner for reading an original image the image scanner comprising (a) scanning means having a light source for scanning light onto the original image, (b) a camera portion for receiving the image from the scanning means, (c) means for providing a constant optical path length between the original and the camera portion irrespective of a movement of the scanning means, the camera portion comprising an optical sensor, a lens, and an optical component having a refractive index greater than one, the optical component being movable into and out of the optical path for focussing and defocusing the image of the original at the optical sensor.

If an optical component having a refractive index greater than 1 is inserted at the optical path between the original image and the sensor, an imaginary light path length between the original image and the lens is reduced by $T(1-(1/N))$, where T is a thickness of the optical component, and N(greater than 1) is a refractive index thereof. Thus, defocusing or focussing can be selectively provided by moving the optical component into or out of the optical path. For example, by setting the lens at a position for focussing when the optical component is inserted into the optical path, defocusing can be provided by moving the optical component out of the optical path. Conversely, by setting the lens at a position for focussing when the optical component is out of the optical path, defocusing can be provided by inserting the optical component into the optical path. An image which is read for producing, a high resolution image at the image sensor is focused in that there is a lesser likelihood that the image will encounter moire. In contrast, an image which is likely to encounter moire will be defocused to avoid generation of moire.

DETAILED DESCRIPTION OF THE PREFERRED EMBODIMENT

Figure 1:
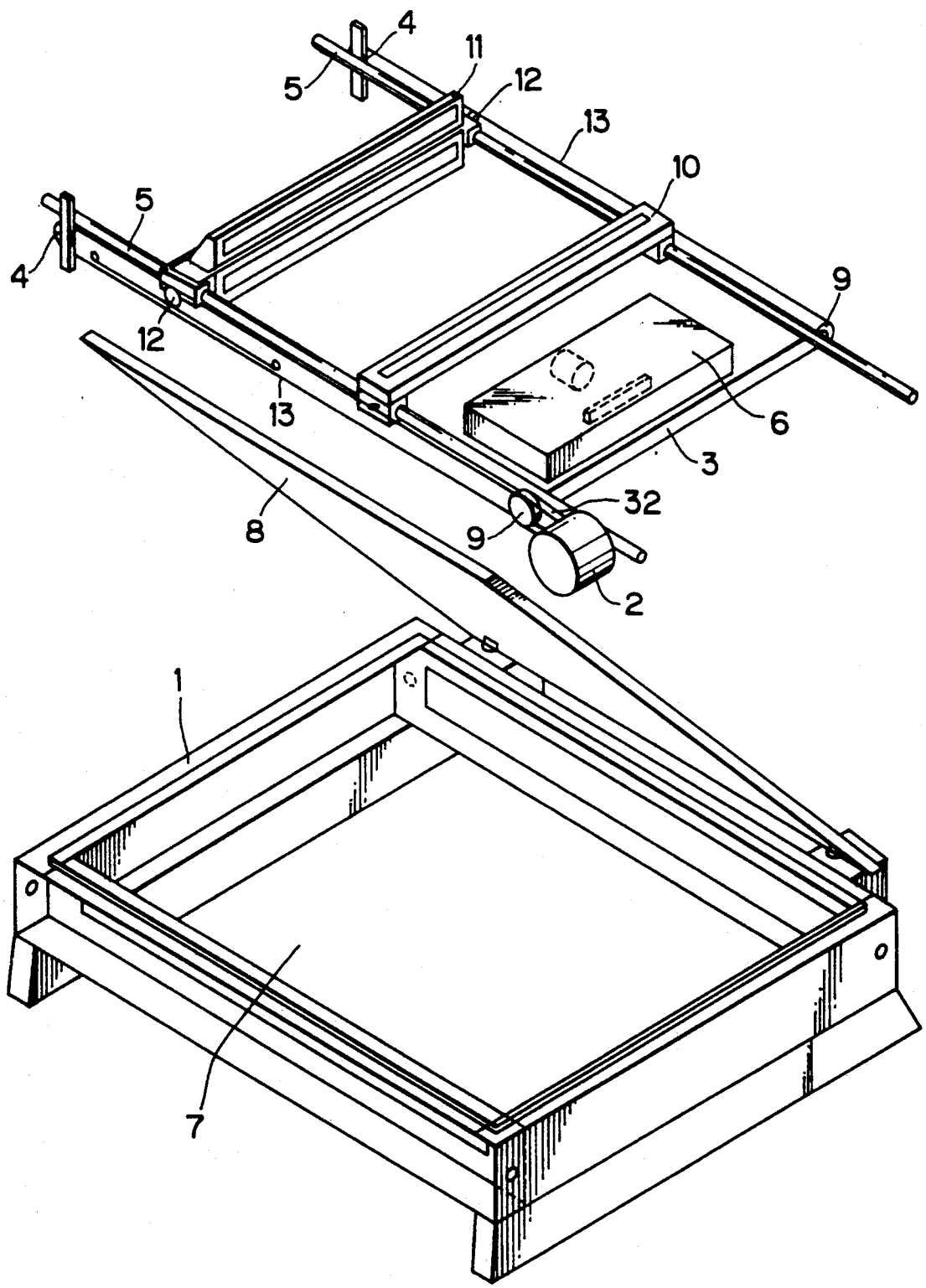
FIG. 1 is an exploded perspective segmental view showing an overall arrangement of an image scanner according to a first embodiment of this invention.
Figure 2:
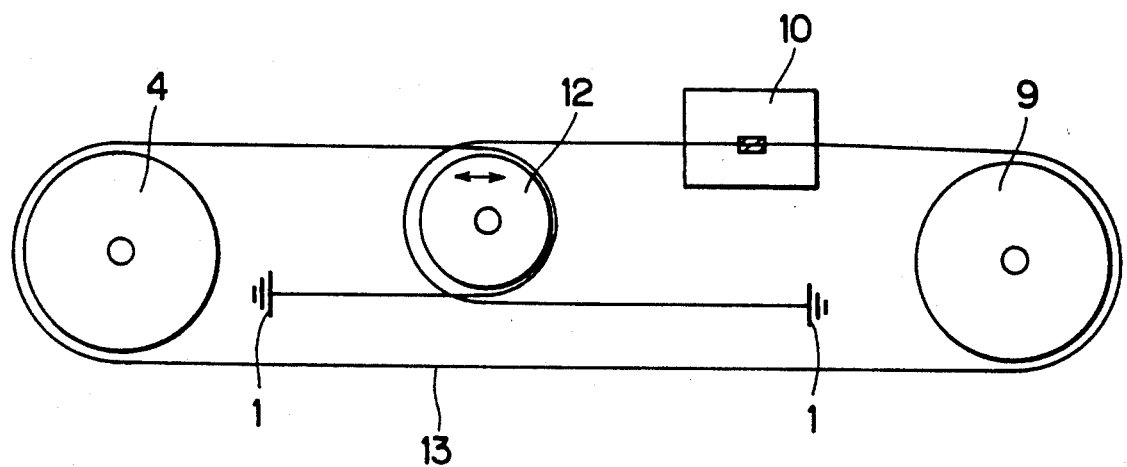
FIG. 2 is a schematic side view showing a route of a wire mounted on pulleys according to the image sensor of the first embodiment of this invention.

An image scanner according to a first embodiment of this invention will be described with reference to FIGS. 1 through 5. First, an overall arrangement of the image scanner is shown in FIGS. 1 and 2. The scanner includes a frame 1 on which an original support 7 is mounted. An original cover plate 8 is pivotally supported to the frame 1 for holding an original 22 (FIG. 3) between the original support 7 and the original cover plate 8.

A drive motor 2 is fixedly secured to the frame 1, and a drive shaft 3 is rotatably supported to the frame 1 through bearings (not shown). Further, a first set of idle pulleys 4 and 4 are rotatably supported to the frame 1, and a pair of guide bars 5, 5 and a camera portion 6 are also fixed to the frame 1. The drive shaft 3 has both ends coupled to drive pulleys 9, 9. One of the drive pulleys 9 is drivingly connected to the drive motor 2 through a power transmission belt 32. Therefore, the drive shaft 3 and other drive pulley 9 are rotatable about their axes.

A full-speed mirror portion 10 and a half-speed mirror portion 11 are slidably disposed over the pair of guide bars 5 and 5. The half-speed mirror portion 11 is positioned closer to the first idle pulley 4 than the full-speed mirror portion 10. A second pair of idle pulleys 12 are rotatably attached to distal ends of the half-speed mirror portion 11. Further, a pair of wires 13 are provided. Each wire has both ends fixed to the frame 1, and is looped, as best shown in FIG. 2, around the second idle pulley 12, the first idle pulley 4, the drive pulley 9 and again the second idle pulley 12. Further, the full-speed mirror portion 10 is fixedly connected to the wire 13.

With the wire mounting as described above, the second idle pulley 12 is rotatable in a direction the same as that of the drive pulley 9, and full-speed mirror portion 10 and the half-speed mirror portion 11 are moved in the same direction. More specifically, upon rotation of the drive pulley 9, the wire 13 is driven to move the full-speed mirror portion 10 in a velocity which is the same as a moving velocity of the wire 13. In this case, the half-speed mirror portion 11 is movable in the half velocity of the full-speed mirror portion 10.

Figure 3:
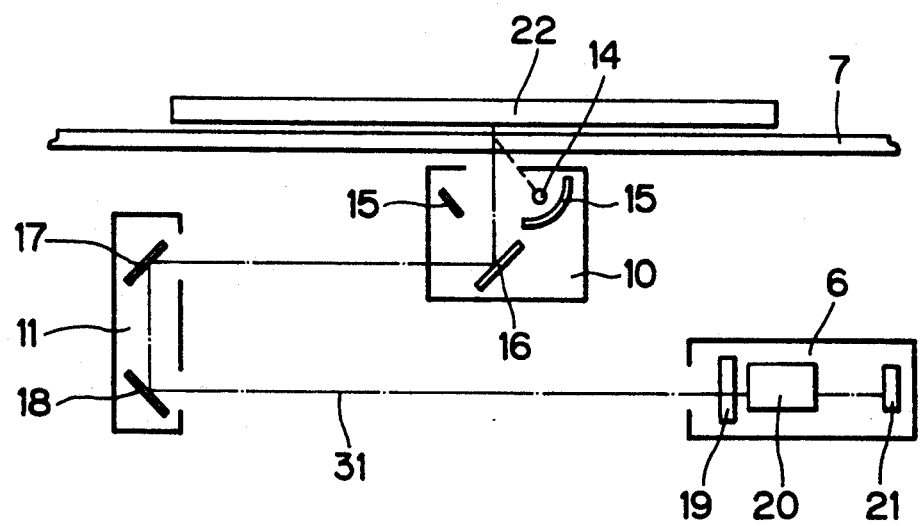
FIG. 3 is a schematic cross-sectional view showing the image scanner according to the first embodiment of this invention.

As best shown in FIG. 3, the full-speed mirror portion 10 includes a halogen lamp 14, a reflector 15 and a mirror 16. The reflector 15 is adapted for directing light from the light source 14 toward an imaging surface of the original 22, and the mirror 16 is adapted for directing light reflected from the original toward the half-speed mirror portion 11. The half-speed mirror portion 11 includes a first mirror 17 on which the light from the mirror 16 is applied, and a second mirror 18 for directing light from the first mirror 17 toward the camera portion 6. In this connection, the first and second mirrors 17 and 18 define an angle of 90 degrees.

The camera portion 6 includes a plane glass 19 having opposite surfaces parallel with each other, a lens 20 and a CCD sensor 21. The plane glass 19 is relatively movable toward and away from an optical path 31 (described later), and the lens 20 is adapted for focussing an image of the original 22 on the CCD sensor 21. Thus, a J-shaped optical path 31 is provided between the mirror 16 and the CCD sensor 21 through the first and second mirrors 17, 18, the plane glass 19 and the lens 20. Further, the plane glass 19 is movable into and out of the optical path 31 as described later. With the arrangement, a distance between the lens 20 and the original image 22 can be maintained in a constant distance irrespective of the moving position of the full-speed mirror portion 10. Thus, the light scanning operation of the full-speed mirror portion 10 can provide an image of the original on the CCD sensor 21 at a predetermined focussing rate.

Figure 4:
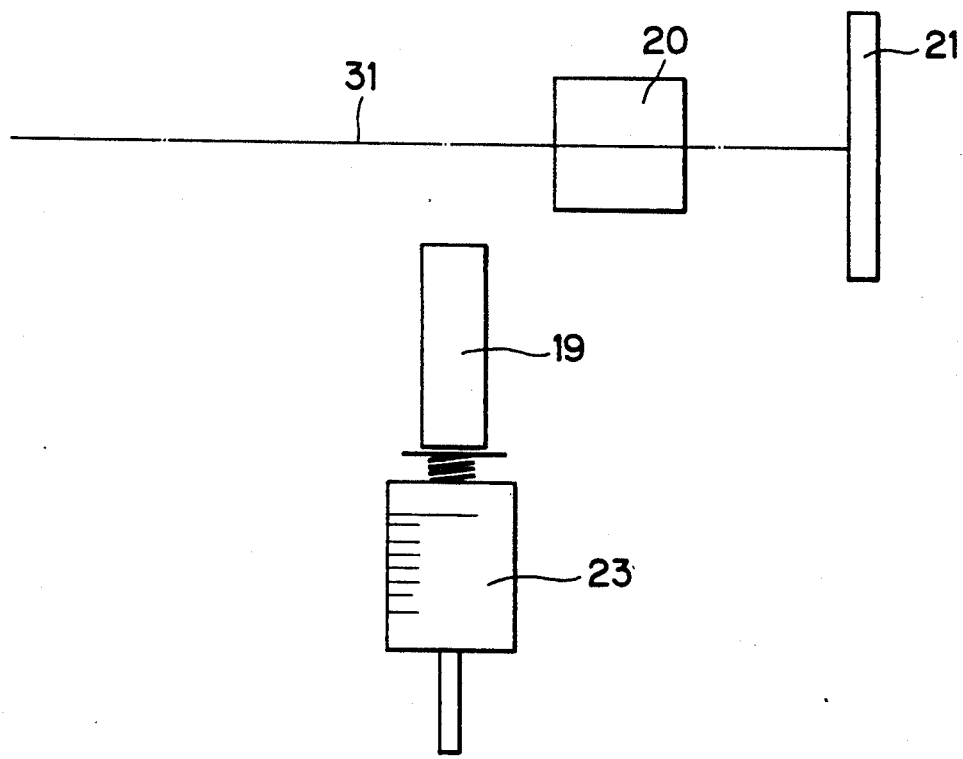
FIG. 4 is a view for description of an offsetting arrangement of a plane glass from an optical path bridging between an original image and an optical sensor according to a camera portion of the first embodiment.
Figure 5:
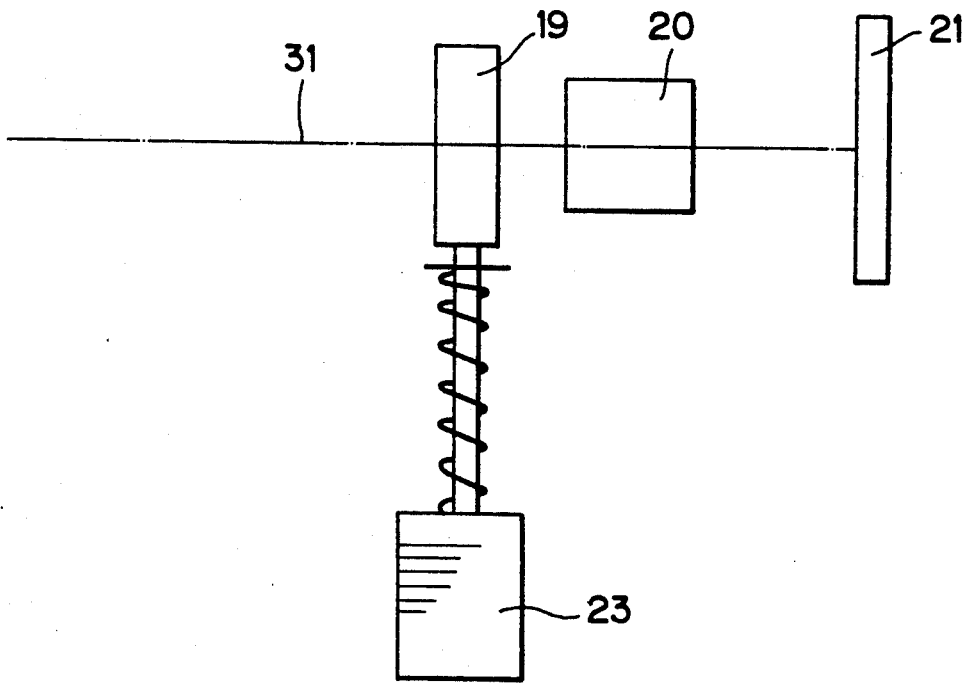
FIG. 5 is a view for description of alignment or insertion of the plane glass of the camera portion with or into the optical path according to the first embodiment.

Next, the camera portion 6 will be described with reference to FIGS. 4 and 5. The camera portion 6 is provided with the plane glass member 19, a solenoid 23 for moving the plane glass member 19, the lens 20 and the CCD sensor 21. The camera portion also includes a manipulation switch (not shown) connected to the solenoid 23 for selectively moving the plane glass member into and out of the optical path. The plane glass member 19 has a refractive index of about 1.5, and has a uniform thickness of about 2 mm. The lens 19 has an object side principal point, and an image side principal point. In a case where a picture image or a character image having low spatial frequency may encounter Moire, the manipulation switch is manipulated for energizing the solenoid 23 in order to move the plane glass 19 away from the optical path 31. In this case, characteristics effecting lens 20 are mathematically determined as follows:

$$(1/S1)+(1/S2)=1/F$$

where;
F is a focal length of the lens 20;
S1 is a distance between the original image and the object side principal point of the lens 20; and
S2 is a distance between the CCD sensor 21 and the image side principal point of the lens 20.

Therefore, the image of the original 22 can be focussed on the CCD sensor 21 at high resolution for image reading. On the other hand, in a case where a dot printing image or a fine continuous pattern image is to be read (and in which moire is highly likely to be present), the manipulation switch is shut-off for deenergizing the solenoid 23, so that the plane glass 19 is moved into the optical path 31. In this case, the imaginary distance between the image of the original 22 and the object side principal point of the lens 20 can be represented by the following formula:

$$S1=(1-(1/N))T$$

where;
N is the refractive index of the plane glass (N is greater than 1), and
T is the thickness of the plane glass 19.

Since N is about 1.5 (a refractive index of glass), the imaginary distance is reduced in comparison with the case where the plane glass 19 is out of the optical path 31. Accordingly, the original image is formed on the CCD sensor 21 and is defocused. As a result, the plurality of dot points and fine continuous patterns are subjected to leveling to avoid generation of Moire.

Figure 6:
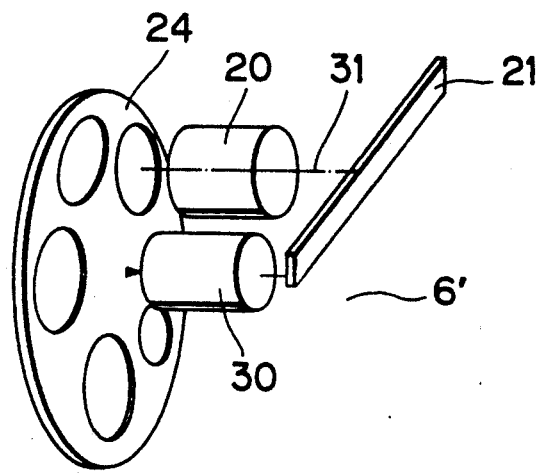
FIG. 6 is a partial perspective view showing a camera portion of an image scanner according to a second embodiment of this invention.
Figure 7:
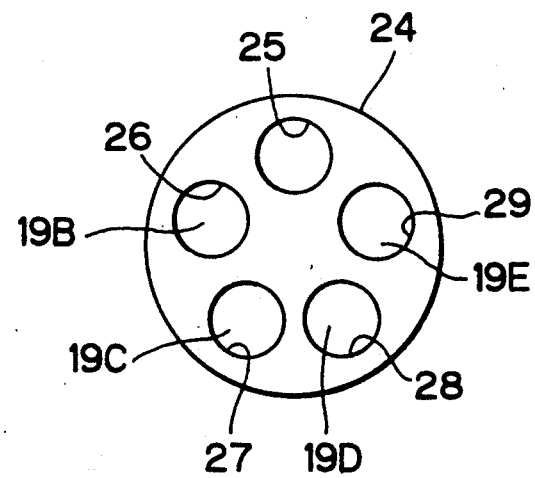
FIG. 7 is a front view showing a holder of the camera portion of the image scanner according to the second embodiment of this invention.

A camera portion 6' according to a second embodiment of this invention will next be described with reference to FIGS. 6 and 7. In the camera portion 6', there is provided a holder 24, a stepper motor 30 for drivingly rotating the holder 24 about an axis of the holder, a lens 20 and a CCD sensor 21. A plurality of through-holes 25 through 29 are formed in the holder 24, and various kinds of plane glasses 19B through 19E are assembled into the through holes 26 through 29. These plane glasses have parallel plane surfaces, and have thickness of 1 mm, 2 mm, 3 mm and 4 mm, respectively. No plane glass is assembled to the through hole 25. If a picture image or a character image is to be read having low spatial frequency and which may not encounter Moire, a manipulation switch (not shown) is operated for energizing the stepper motor 30 in order to rotate the holder 24 about the axis of the holder to thereby align the through hole 25 with the optical path 31. In this case, the image of the original 22 can be clearly focussed on the CCD sensor 21 to provide a high resolution image available for image reading. On the other hand, if a dot printing image or a fine continuous pattern image is to be read and which image is likely to encounter Moire, the manipulation switch is manipulated to selectively position one of the plane glasses 19B through 19E at the optical path 31. In this case, one of the plane glasses is selected in accordance with the spatial frequency attendant to the original image to be read.

In the depicted embodiments, only one plane glass is selectively positioned in the optical path. However, a plurality of plane glasses can be inserted into and moved away from the optical path for suitably controlling the imaginary distance between the original image and the lens 20. Further, in the illustrated embodiments, the plane glass 19 is positioned between the original image 22 and the lens 20. However, the plane glass can be positioned between the lens 20 and the CCD sensor 21. The, refractive index and the thickness of the plane glass are not limited to the above described values, but various levels of these would be available.

Further, in the above described embodiment, the movement of the plane glass 19 into and out of the optical path 31 indicates the defocusing and focussing of the image of the original 22 at the CCD sensor 21, respectively. However, the reverse operation is also achievable such that the movement of the plane glass into and out of the optical path indicates the focussing and defocusing of the image at the CCD sensor 21, respectively.

As described above, according to the present invention, since an optical component made of a material whose refractive index is greater than 1, can be positioned at the optical path 31 or moved out of the optical path 31 focusing and defocusing the image of the original 22 on the CCD sensor 21 can be easily provided, to thereby selectively obtain a high resolution image and an image having no Moire.

While the invention has been described in detail and with reference to specific embodiment thereof, it would be apparent to those skilled in the art that various changes and modifications may be made therein without departing from the spirit and scope of the invention.

What is claimed is:

1. An image scanner for reading an image of an original comprising:
    scanning means having a light source for scanning light onto the image of the original;
    a camera portion for receiving the image of the original from the scanning means;
    means for providing a constant optical path length between the original and the camera portion irrespective of a movement of the scanning means, the camera portion comprising an optical sensor, a lens, a holder rotatable about an axis and formed with n through holes, n being an integer greater than 1, (n-1) plane glasses, each glass having a refractive index greater than one and a uniform thickness different from the other glasses, each glass being disposed in a different one of the through holes, and drive means for rotating the holder to position a selected one of the through holes in the optical path for focussing and defocussing an image on the optical sensor.

2. The image scanner as claimed in claim 1, wherein the drive means comprises a stepper motor.

3. The image scanner as claimed in claim 1, wherein the means for providing a constant optical path length comprises:
    a frame;
    a drive motor mounted on the frame;
    a drive shaft rotatably supported by the frame;
    a pair of drive pulleys coupled to the drive shaft and connected to the drive motor for rotating the drive shaft about an axis of the drive shaft;
    a first pair of idle pulleys rotatably supported on the frame;
    a pair of guide rods supported to the frame;
    a first mirror unit slidably disposed on the guide rods;
    a second mirror unit slidably disposed on the guide rods;
    a second pair of idle pulleys rotatably supported on the second mirror unit; and
    a pair of wires, each wire having both ends of the wire fixed to the frame and each wire being mounted over one of the second idle pulleys, one of the first idle pulleys, one of the drive pulleys and again over said one of the second idle pulleys, the first mirror unit being fixed to the pair of wires.

4. The image scanner as defined in claim 3, wherein the scanning means is provided on the first mirror unit.

5. An image scanner for reading an image of an original, the image scanner comprising:
    scanning means having a light source for scanning light onto the image of the original;
    a camera portion for receiving the image of the original from the scanning means;
    means for providing a constant optical path length between the original and the camera portion irrespective of movement of the scanning means,
    the camera portion comprising:
        an optical sensor,
        a lens,
        a holder rotatable about an axis thereof,
        a plurality of plane glasses mounted on the holder and having a refractive index greater than one, each plane glass having a thickness different from the thickness of all of the other plane glasses, and
        a positioning means connected to the holder for positioning a selected one of the plane glasses in the optical path.

6. The image scanner as claimed in claim 5, wherein the positioning means comprises a stepper motor.

7. The image scanner as claimed in claim 5, wherein the means for providing a constant optical path length comprises:
    a frame;
    a drive motor mounted on the frame;
    a drive shaft rotatably supported by the frame;
    a pair of drive pulleys coupled to the drive shaft and connected to the drive motor for rotating the drive shaft about an axis of the drive shaft;
    a first pair of idle pulleys rotatably supported on the frame;
    a pair of guide rods supported to the frame;
    a first mirror unit slidably disposed on the guide rods;
    a second mirror unit slidably disposed on the guide rods;
    a second pair of idle pulleys rotatably supported to the second mirror unit; and
    a pair of wires, each wire having both ends of the wire fixed to the frame and each wire being mounted over one of the second idle pulleys, one of the first idle pulleys, one of the drive pulleys and again over said one of the second idle pulleys, the first mirror unit being fixed to the pair of wires.

8. The image scanner as claimed in claim 5, wherein the holder is formed with n through holes, wherein n is an integer greater than one, and wherein (n-1) plane glasses are each disposed in a different one of said through holes.

9. The image scanner as claimed in claim 8, wherein the positioning means comprises a stepper motor.

10. The image scanner as claimed in claim 8, wherein the means for providing a constant optical path length comprises:
    a frame;
    a drive motor mounted on the frame;
    a drive shaft rotatably supported by the frame;
    a pair of drive pulleys coupled to the drive shaft and connected to the drive motor for rotating the drive shaft about an axis of the drive shaft;
    a first pair of idle pulleys rotatably supported on the frame;
    a pair of guide rods supported to the frame;
    a first mirror unit slidably disposed on the guide rods;
    a second mirror unit slidably disposed on the guide rods;

a second pair of idle pulleys rotatably supported to the second mirror unit; and a pair of wires, each wire having both ends of the wire fixed to the frame and each wire being mounted over one of the second idle pulleys, one of the first idle pulleys, one of the drive pulleys and again over said one of the second idle pulleys, the first mirror unit being fixed to the pair of wires.

* * * * *